United States Patent [19]
Cragun et al.

[11] Patent Number: 5,973,683
[45] Date of Patent: Oct. 26, 1999

[54] DYNAMIC REGULATION OF TELEVISION VIEWING CONTENT BASED ON VIEWER PROFILE AND VIEWING HISTORY

[75] Inventors: Brian John Cragun; Paul Reuben Day, both of Rochester, Minn.

[73] Assignee: International Business Machines Corporation, Armonk, N.Y.

[21] Appl. No.: 08/977,074

[22] Filed: Nov. 24, 1997

[51] Int. Cl.[6] .............................. H04N 7/00; H04N 7/16
[52] U.S. Cl. .............................. 345/327; 348/2; 348/5.5; 455/2; 709/217
[58] Field of Search .................................. 345/326, 327; 395/200.47, 200.48, 200.49; 348/1, 2, 5.5, 6, 7, 10, 12, 13, 906; 455/2, 3.1, 4.1, 4.2, 5.1, 6.1, 6.2, 6.3; 380/9, 10, 20; 709/217–219; H04N 7/00, 7/16

[56] References Cited

U.S. PATENT DOCUMENTS

| | | |
|---|---|---|
| 4,348,696 | 9/1982 | Beier . |
| 4,566,033 | 1/1986 | Reidenouer . |
| 4,718,107 | 1/1988 | Hayes . |
| 4,751,578 | 6/1988 | Reiter et al. ............................ 348/564 |
| 4,751,587 | 6/1988 | Asahina . |
| 4,888,796 | 12/1989 | Olivo, Jr. . |
| 4,930,160 | 5/1990 | Vogel . |
| 5,033,085 | 7/1991 | Rew . |
| 5,060,079 | 10/1991 | Rufus-Isaacs . |
| 5,168,372 | 12/1992 | Sweetser . |
| 5,172,111 | 12/1992 | Olivo, Jr. . |
| 5,270,822 | 12/1993 | Choi . |
| 5,410,344 | 4/1995 | Graves et al. .............................. 348/1 |
| 5,465,113 | 11/1995 | Gilboy ..................................... 348/5.5 |
| 5,485,518 | 1/1996 | Hunter et al. ......................... 348/5.5 X |
| 5,550,575 | 8/1996 | West et al. ............................... 348/5.5 |
| 5,576,755 | 11/1996 | Davis et al. ......................... 348/906 X |
| 5,583,576 | 12/1996 | Perlman et al. ..................... 348/5.5 X |
| 5,666,645 | 9/1997 | Thomas et al. ........................... 455/6.1 |
| 5,758,257 | 5/1998 | Herz et al. .................................... 455/2 |
| 5,758,258 | 5/1998 | Shoff et al. .......................... 348/5.5 X |
| 5,805,204 | 9/1998 | Thompson et al. ................ 348/906 X |
| 5,828,402 | 10/1998 | Collings ................................... 348/5.5 |
| 5,828,945 | 10/1998 | Klosterman ............................. 455/4.2 |
| 5,845,260 | 12/1998 | Nakano et al. ......................... 348/1 X |

*Primary Examiner*—John W. Miller
*Attorney, Agent, or Firm*—Andrew J. Dillon

[57] ABSTRACT

A user friendly method for regulating the media environment of a television viewer by controlling content displayed on the television. The method controls content in response to a viewer's profile, accumulated viewing time and at least one content classification source. A viewer's profile is provided by a user which determines guidelines for an individual viewer. Content classification values for television are received and stored in response to a viewer's request for viewing a program. The content classification values correspond to television program availability and values attributed to viewing time. The content classification values are categorized into desirable content and undesirable content. The viewer profile data associates a viewer with a content classification value. Thereafter, the quantity of time a viewer spends viewing desirable content and the quantity of time a viewer spends viewing undesirable content is determined. In response to a multidimensional user selected censorship structure, the media environment of the viewer is regulated. The censorship structure utilizes variables such as content classification values, rating value, rankings of rating sources and viewing time credits for desirable material and viewing time debits for undesirable material. Additionally, the method down-loads the content classification values from multiple sources utilizing an interconnected computer. Many sources can be queried utilizing the user selected ranking of rating sources and the user can edit the ratings. The present invention controls the television environment in response to past behavior of a viewer.

20 Claims, 5 Drawing Sheets

DYNAMIC REGULATION OF TELEVISION VIEWING CONTENT BASED ON VIEWER PROFILE AND VIEWING HISTORY

BACKGROUND OF THE INVENTION

1. Technical Field

The present invention relates in general to a method and system for controlling a television and in particular to a method and system for controlling the content displayed on a television utilizing a computer system implementing multidimensional control having a user friendly interface. Still more particularly, the present invention relates to a method and system for down loading television ratings and television scheduling from user selected sources, such that a user or an authority figure can automatically control a minor's media environment. More particularly, the present invention can provide a method and system for controlling a minor's media environment utilizing the minor's accumulation of desirable and undesirable viewing time.

2. Description of the Related Art

It is believed by many Americans that television programs are influential in the lives of our nation's children. More particularly, parents are concerned with the negative influence television has on their children's social and physiological development. As a result, special interest groups continue to lobby for greater government regulation of broadcast content. Legislative solutions to television censorship have been attempted; however, first amendment rights continue to block such efforts.

Currently, millions of American families are single parent or dual income. Often, this phenomena places a child alone in a home with the unrestricted availability of a television. In this circumstance a child's television choice cannot be directly supervised. Commercially available systems are expensive, convoluted and time intensive to implement. Working parents do not have the excess time which is required to effectively and satisfactory operate existing censorship systems. However, the amount of time spent by children viewing television, and the amount of time spent by children viewing offensive content is of great concern to parents.

Recent advances in microprocessor controlled televisions has made available more censorship control of television content to parents. However, current technology still falls short of the public's desire. Currently, censorship based on content ratings, supplied by broadcasters, is available if a household is equipped with the proper equipment. New semiconductor devices contained within televisions have been specifically developed for censoring television programs based on broadcaster's supplied received ratings.

Presently, a broadcaster's rating, in conjunction with enhancements in television control, allows a parent or guardian to set a threshold censorship level. In such a system, a broadcast program is displayed if the broadcaster's rating is less than a threshold level set by the parent. For example, a guardian can set a television to censor any program above and including the PG level. If the broadcaster classifies a program as R, it will not be displayed on the television because the threshold classification set by the guardian has been exceeded.

Currently, the most familiar standardized rating system provides audience ratings from G to R. Many problems exist with all current rating systems. Parents must decide what constitutes objectionable material regardless of the network ratings. For example, professional wrestling is unrated, however some parents consider professional wrestling a violent activity.

In an attempt to overcome obvious deficiencies, proposed rating systems have added additional categories within each audience rating. For example, new categories include violence, sexual content, language, nudity and adult subject matter. Every new category has intensity levels defined by a number. For example, violence has five intensity levels. For example, a level one violence rating is comic violence such as found in cartoons. Level five under the violence category is graphic violence, such as decapitation and torture. Greater resolution of content ratings is part of an intense effort to satisfy the public's demand for censorship. However, additional rating systems and censorship devices still have not provided acceptable control to the majority of concerned parents.

A significant drawback to all present and proposed rating systems is that the organization which produces the programs has influence on the actual rating. Additionally, the implementation of the system is dependent on the broadcasting networks and cable companies to insert the ratings into the broadcast signal. Thus, it is the marketing organization of the programs that assigns and controls the ratings. This infrastructure suggests a conflict of interest.

In all known prior art, an effective utilization of broadcast ratings requires the participation of broadcasters. If broadcasters refuse to provide a program classification signal, rating solutions are ineffective. More importantly, even if broadcasters cooperate, establishing uniform and homogeneous standards to satisfy people with diverse values are futile. Certain subject matter may be acceptable to one person but quite unacceptable to another. Currently, parents are limited to a rigid rating system which was created by a committee of bureaucrats.

It is also believed by many experts that television can have negative effects on individuals during adolescence. It is also understood that television can have considerable educational value for children. Many broadcasters offer channels which are purely educational and hence do not require a rating system. Educational broadcasts provide an effective and efficient learning source for children.

Often, a television program will contain morally offensive content amid highly educational subject matter. A rigid rating system can not accurately predict a parent's reaction to the foregoing situation. A big drawback to all prior art censorship systems is whether or not the public in general or a specific viewer agrees with a broadcaster's rating of a particular program. Rating the content of a program is very subjective. Considerable rating disparity can exist between networks. Adding more levels to existing rating systems has not addressed the public's long felt need for a practicable system. Many programs deal obliquely with adult material. In this instance, often a parent is not offended if a child watches such a program. Rating oblique subject matter is debatable and consequently, many parents forego censorship of this type of material. For example, comedies containing innuendo pertaining to sex or other potentially offensive subject matter is rarely comprehended by children. Again, television programs do not fit into neat, clear-cut rating categories.

All prior art censor systems are subjective and unavoidably rigid. Additionally, for a censorship system to perform adequately, a parent or guardian has to spend an inordinate amount of time deciding where every program fits into an imperfectly defined category of acceptability. For example, a PG rated movie can be mild with respect to violence yet contain profanity. A PG rated movie may be non-violent with mild language, although satanical. An issue which is unaddressed in the prior art is, how does a parent measure and regulate profanity or atheist views. Often, the offensive nature of a program can only be attained after observing the program in its totality. Generally, a parent's judgement evolves as he or she views more than one scene. By the time offensive subject matter is observed, it is too late for a parent to censor the offensive material. In summary, a PG rating does not adequately inform a guardian of what will be displayed during a program.

Currently, adequate parental control of a child's television viewing habits are difficult, time consuming and unworkable. Current television ratings systems are vague. The broadcast industry has added new classifications such as TV-14, and TV-M. However, additional ratings do not address parental needs. Often, not enough information about the definition of the new classifications is explained to parents. Further, broadcasters do not have sufficient incentive to help identify objectional material. Due to the lack of incentive, broadcasters have been reluctant to implement an improved rating system.

A variety of proposals have heretofore been made to address the selective viewing needs of the American family. Most of the proposals have either been limited in their focus or they have lacked practicability. Thus, for example, a system for obtaining and viewing a listing of programs scheduled for presentation has been described in U.S. Pat. No. 4,571,578 which was granted to Reiter et al. on Jun. 14, 1988. In addition to down-loading and displaying a listing of programs, it proposed generalized access control. Reiter et al. discloses memory which could be utilized to permit the owner of the invention to control access to the television, or access to particular television channels. In order to control viewer access, the memory could instruct the viewer to input a password for all future utilization of the system and/or television. Although suggesting a form of general access control, there appears to be no teaching or the utilization of content censorship; and the thrust of the Reiter et al. reference is to aid in searching for user desirable programs rather than censoring undesirable ones.

Another approach to providing censorship has been to implement a converter with a feature known as "Parental Control." Some "Parental Control" systems employ a key or code to block one or more selected channels from viewing. An example of one such system is that of U.S. Pat. No. 4,718,107 granted to Hayes. According to the Hayes system, when one or more channels are blocked, all of the programs on a blocked channel are made inaccessible to a viewer. A problem with this approach is that some good or otherwise acceptable programs are blocked along with the unacceptable programs. Thus, a guardian or parent always wishing to exclude a violent or sexy police program from the view of his young children may also be blocking access to his or her favorite baseball program which is subsequently broadcast. Under channel blocking proposals, everything on a channel is either blocked or everything on a channel is available for viewing.

The shortcomings of the channel blocking approach have been recognized by others and there have been attempts to devise ways to block individual programs without disabling an entire channel. Some of these approaches attach a "Material Content Signal" to programs. Examples of this approach are those of U.S. Pat. Nos. 4,888,796 and 5,172,111 to Olivo, Jr. According to such proposals a receiving device, upon recognizing the "Material Content Signal," blocks the television program unless a secret code or password has been entered into the receiver through a key pad.

U.S. Pat. No. 5,033,085 to Rew and U.S. Pat. No. 5,270,822 to Choi, have devised similar methods but have differed in the design of their receiving devices. The disclosures rely on an electronic signal accompanying the broadcast program, such signal being recognized by the receiver which automatically deactivates the television or refuses access to the television channel while the electronic signal is present.

While overcoming the all or nothing problem mentioned above, such approaches also have their own shortcomings. First, such solutions are limited because there is but one censor threshold per television set. For example, in a family with a parent, a very young child, a teenage child and grandparent, all members of the household must adhere to one of two choices: either a censored level geared for one member of the household or access to all programs. Additionally, these inventions depend on a broadcaster's subjective and rigid rating system.

An improved program blocking or censorship approach is described in U.S. Pat. No. 4,930,160 to Vogel. According to the Vogel proposals, program classification signals are encoded in a video or audio portion of the received programs. The user input provisions, while an improvement over other proposals, as described above, also suffers from its limitations. The censorship standards utilized under this proposal come from a central censorship authority. This approach also requires the participation of the broadcasters and parental acceptance of the broadcasters standards to be acceptable.

Although parents desire to control program content, many parents want to control the amount of time children spend watching the television. Thus, it has been observed that excessive viewing time, especially for children, may displace more worthy activities such as school study or physical fitness activity. Here, also, there have been proposals for control. In U.S. Pat. No. 4,566,033 Reidenouer, there is proposed a system in which a token is employed to activate a television set for a predetermined period of time. However, such proposals do not distinguish between different users nor do they provide for user identification. In this "token-operated" system, operation inhibiting power to the television set is the control mechanism. Thus, reprogramming of any pre-programmed features is a considerable drawback in this invention.

U.S. Pat. No. 4,348,696 to Beier discloses the utilization of a microprocessor and stored passwords to distinguish between multiple viewers. In addition, it provides for inhibited viewing during selected periods of time during each day. However, it is very complex and suffers from the disadvantage of controlling power application to the television set. It also does not provide for an override capability.

U.S. Pat. No. 5,060,079 to Rufus-Isaacs discloses an arrangement which utilizes a transportable magnetic medium to activate the television and also provides a readout for viewers so they will know how much time a program has remaining. However, transportable mediums can be exchanged, borrowed or, more likely, lost or misplaced by children. If exchanged, borrowed or altered, children can have access to prohibited programs. On the other hand, if lost, there is no access until another or replacement magnetic medium is provided.

U.S. Pat. No. 5,168,372 to Sweetser describes a time control system which incorporates a viewing allowance that, if exceeded, interrupts the radio frequency input signal. Viewing times can be set on a daily or weekly basis. In addition, the Sweetser system includes block out times for each of a plurality of designees (e.g. children) during any day of the week. An override feature is included which allows a parent to watch television regardless of existing censorship. The system is also capable of channel blocking. Thus, Sweetser does not control what is seen but only how long it is seen, and the limited channel blocking ability contains the same limitations described above. However, as with others of the foregoing proposals, such proposals are single dimensional in that they do not allow a selection from diverse sources to structure the censorship.

Prior art push button based proposals for entering passwords (personal identification numbers, generally known as PIN codes) have certain disadvantages. By the time children reach school age, they are able to count to ten and read numbers. They also have enough dexterity to operate video games. By limiting passwords to a sequence of four colored buttons, the possibility of password theft becomes substantial. An older child can either watch a sibling enter his/her password or, through simple experimentation, can ascertain another's password.

An additional disadvantage of the Sweetser proposal is that its programming is cumbersome. Programming prompts are in symbols rather than in written words. To program the unit, one must constantly refer to the accompanying literature, and time allowances can be set either daily or weekly but not in combination. Finally, because the unit is not down line activated, it is not suitably designed to be offered as a cable company service. All of the above mentioned prior art still have the problem of viewer diversity and differing moral values as applied to censorship. Television programs that seem harmless to one person are considered totally unacceptable and morally wrong by other. Again, existing censorship methods are too time intensive, complex, and expensive and hence impracticable to be acceptable for most parents.

As suggested above, none of the foregoing proposals include a comprehensive multi-dimensional solution to television control with minimal parental input. All of the proposals are rigid and attempt to address one small problem without addressing an overall solution. The prior art fails to teach of a comprehensive approach and much of the prior art is time intensive to set-up and operate. Therefore, the present systems are less than acceptable.

Additionally, some prior art solutions, while being technically feasible, are not effective because they depended on the participation of the broadcaster and a network controlled subjective rating system. Allowing the participation of broadcasters' censorship is precarious because we are requiring the broadcasters to censor their own creation. Accordingly, in spite of a variety of solutions proposed and patented over many years, effective solutions have yet to be made in the empowering the American family with effective control over their television viewing.

SUMMARY OF THE INVENTION

It is therefore one object of the present invention to provide a method and system for controlling a television.

It is another object of the present invention to provide a method and system for controlling the content displayed on a television utilizing a computer system implementing multidimensional control having a user friendly interface.

It is yet another object of the present invention to provide a method and system for down loading television ratings and television scheduling from user selected sources, such that a user or an authority figure can automatically control a minor's media environment.

It is a further objective to provide a method and system for controlling a minor's media environment utilizing the minor's accumulation of desirable and undesirable viewing time.

A user friendly method for regulating the media environment of a television viewer by controlling content displayed on the television. The method controls content in response to a viewer profile, accumulated viewing time and at least one content classification source. A viewer profile is provided by a user which determines guidelines for an individual viewer. Content classification values for television are received and stored in response to a viewer's request for viewing a program. The content classification values correspond to television program availability and values attributed to viewing time. The content classification values are categorized into desirable content and undesirable content. The viewer profile data associates a viewer with a content classification value. Thereafter, the quantity of time a viewer spends viewing desirable content and the quantity of time a viewer spends viewing undesirable content is determined. In response to a multidimensional user selected censorship structure the media environment of the viewer is regulated. The censorship structure utilizes variables such as content classification values, rating value, rankings of rating sources and viewtime credits for desirable material and viewtime debits for undesirable material. Additionally, the subject method down-loads the content classification values from multiple sources utilizing an interconnected computer. Many sources can be queried utilizing the user defined ranking of rating sources and the user can edit the ratings. The present invention controls the television environment in response to the past behavior of a viewer.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
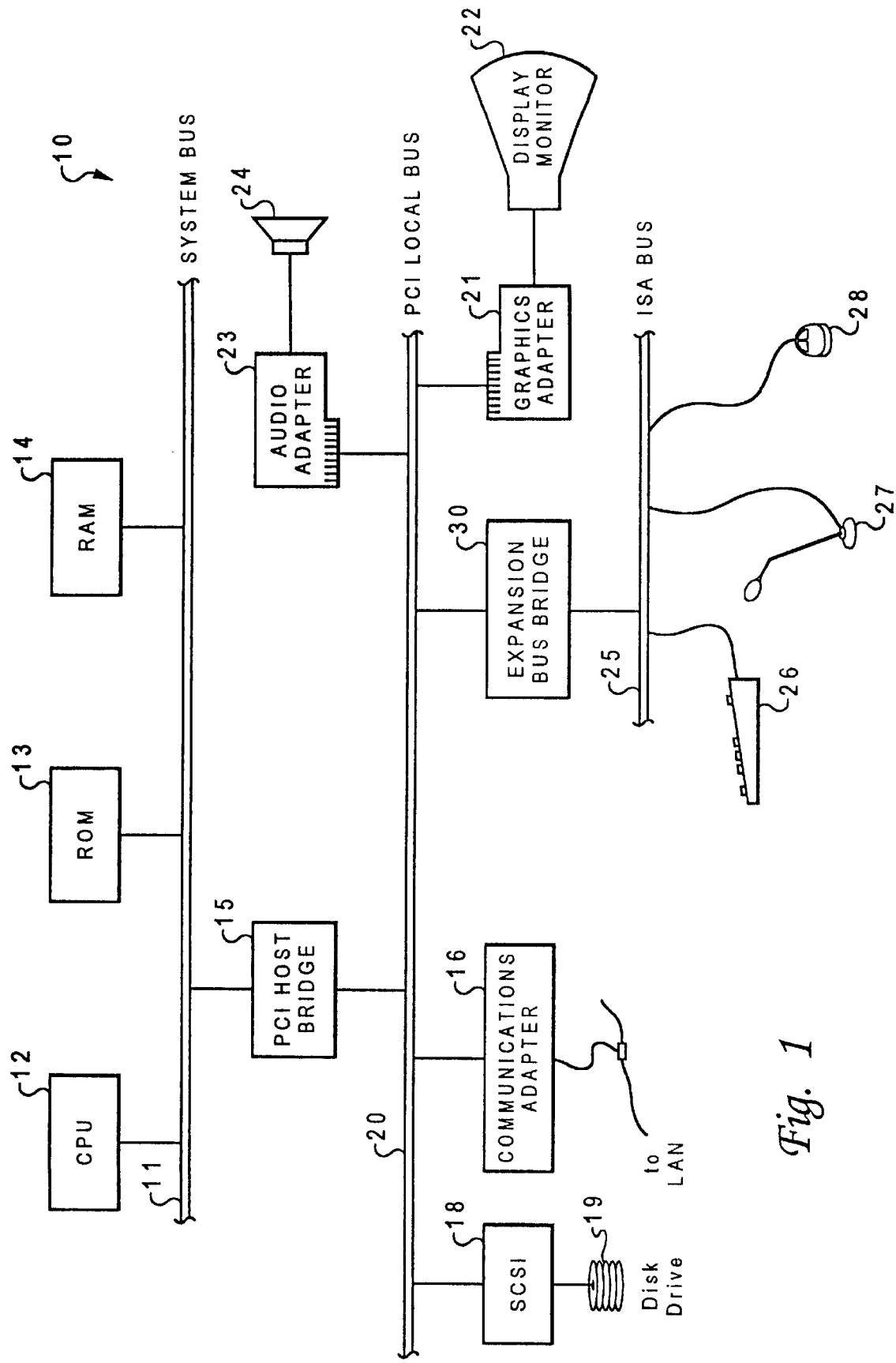
FIG. 1 illustrates an interconnection of computer components which can be utilized to implement the user interface and communication control in the present invention.

With reference now to the figures and in particular with reference to FIG. 1, there is depicted a diagram of a typical computer system 10 which may be utilized in conjunction with a preferred embodiment of the present invention. As depicted, a central processing unit (CPU) 12, a read-only memory (ROM) 13, and a random access memory (RAM)

14 are connected to a system bus 11 of a computer system 10. CPU 12, ROM 13, and RAM 14 are also coupled to a PCI local bus 20 of computer system 10 through a PCI host bridge 15. PCI host bridge 15 provides a low latency path through which CPU 12 may directly access PCI devices mapped anywhere within bus memory and/or input/output I/O address spaces. PCI host bridge 15 also provides a high bandwidth path allowing PCI devices to directly access RAM 14.

In addition, an audio adapter 23 may be attached to PCI local bus 20 for controlling audio output to speaker 24. A graphics adapter 21 may be attached to PCI local bus 20 for controlling visual output to display monitor 22. Also attached to PCI local bus 20 is a small computer system interface (SCSI) 18, and a communications adapter 16. SCSI 18 is utilized to control high-speed SCSI disk driver 19. Communications adapter 16 is for connecting computer system 10 to a local-area network or to other computer systems (not illustrated).

A PCI-to-ISA bus bridge, such as an expansion bus bridge 30 may be utilized for coupling an ISA bus 25 to PCI local bus 20. As depicted, a keyboard 26, a microphone 27, and a mouse 28 may be attached to ISA bus 25 for performing certain basic I/O functions.

Although the illustrated exemplary embodiment describes a PCI local bus 20 and an ISA bus 25, the present invention is not limited to these particular bus architectures. Rather, the present invention can be utilized by different bus configurations having any functional bus architecture. FIG. 1 depicts an architecture commonly utilized to in a modern personal computer. A modern personal computer could be effectively utilized to implement the present invention. However, a subset of the depicted computer elements or a state-of-the art sophisticated computer system could effectively accomplish the features of the present invention. FIG. 1 should not be construed in a limiting sense as it is only one representative model of a system which will operate effectively in conjunction with the present invention.

Figure 2:
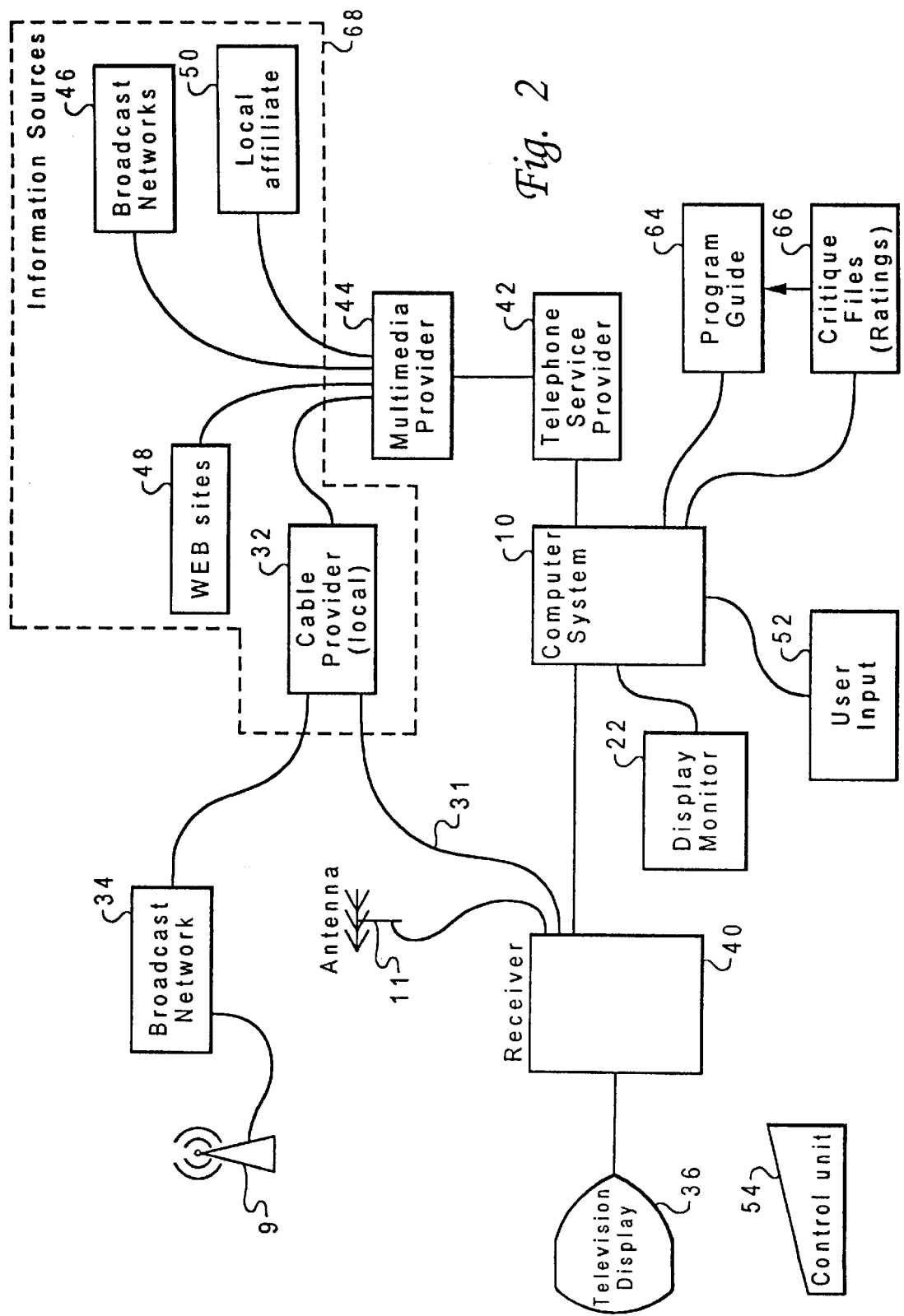
FIG. 2 depicts an interconnection between a television, a computer and communication service providers in accordance with the method and system of the present invention.

Referring now to FIG. 2, a broadcast distribution network interconnected with a computer and an information system provider is depicted. Typically, a local cable provider 32 receives a signal from a broadcast network 34 and distributes the signal to a residential dwelling having a receiver 40. Traditionally a residential dwelling receives a broadcast signal either through a hardwired cable 31 or through an antenna system depicted by broadcast antenna 9 and receiver antenna 11. Receiver 40 could take the form of a standard television tuner or a cable television converter.

In FIG. 2, television display 36 and computer system 10 are depicted coupled together via receiver 40. In an preferred embodiment of the present invention, computer system 10 is connected to telephone service provider 42 and can access multimedia provider 44 through telephone service provider 42. Additional embodiments may provide computer system 10 access to multimedia provider 44 over other communication links, bypassing local communication service providers. Faster communication links such as fiber optics, coaxial cable or radio frequency links such as a cellular telephone would provide an equally acceptable communication link for the present invention. Computer system 10 receives input from user input device 52 and can display user selected settings on display monitor 22. One skilled in the art can appreciate the many different communication links which could be utilized to provide the communication path discussed herein and the communication links discussed herein should not be construed in a limited manner.

Computer system 10 is coupled to television display 36 such that computer system 10 can control television display 36 by sending control signals to receiver 40. Control of television display 36 can be accomplished by many different methods and configurations. For instance, when control is desired, computer system 10 may interrupt power to television display 36 utilizing a relay (not illustrated). In additional embodiments, the radio signal or a processed video signal providing television display 36 may be interrupted by receiver 40. In a preferred embodiment, control is accomplished within receiver 40. Receiver 40 will provide designated channels and omit censored channels when requested by computer system 10. Censorship may be accomplished by scrambling or completely omitting a channel, as if the channel does not exist. When receiver 40 omits channels, it provides a seamless operation to the viewer. For example, if channel 6 is desired to be censored, receiver 40 would omit channel 6 when selected and switch from channel 5 directly to channel 7. Additional embodiments may filter or suppress the radio frequency of a particular channel, or alternatively disable the high voltage supply to television display 36. Again, one skilled in the art can appreciate the many commonly known mechanisms and methods which could be utilized to prevent user censored subject matter from being displayed.

A preferred embodiment of the present invention utilizes digital control to suppress undesirable content. Digital control signals from computer system 10 can control television display 36 through digital interfaces well known in the art. One of such defined digital interface is the "V-chip." A "V-chip" decodes the broadcaster's encoded rating and blocks access to programs with ratings higher than the parental setting. "V-chips" and their interface specifications are well documented and well known by those skilled in the art. Physical implementation of the "V-chip" will not be discussed here.

The development of computerized information distribution and interconnected computers allow users to link with other computer networks, and retrieve vast amounts of electronic information heretofore unavailable in an electronic medium. Such electronic information increasingly displaces more conventional techniques of information transmission, such as newspapers, and magazines. The term "Internet" is an abbreviation for "Internetwork," and commonly refers to a collection of computer networks interconnected over communication links that utilize standard protocols well-known in the art of computer networking.

A basic computer internetwork utilizes a client/server architecture. A "client" is a member of a class or group that utilizes the services of another class or group to which it is not related. In the context of a computer network such as the Internet, a client is a process (i.e., roughly a program or task) that requests a service which is provided by another program. In networked computer systems, a client is usually a computer that accesses shared network resources provided by another computer (i.e., a server).

A "server" is typically a remote computer system accessible over a communications medium such as the Internet. The server scans and searches for information sources. Based upon information requests by the user, the server provides filtered electronic information to the user. In FIG. 1 and FIG. 2, computer system 10 can be a client which is capable of receiving information such as television program scheduling and program ratings. In FIG. 2, the information is provided by broadcast networks 46, web sites 48, local affiliates 50, and local cable provider 32.

The "World Wide Web" partially depicted by dashed enclosure 68, is a series of interconnected servers and information sources coupled together and adhering to a standardized protocol. This enormous interconnection provides access to hundreds of thousands of information sources allowing the user to locate a desirable source. Features and operations of the World Wide Web are well known in the art and will not be discussed here in greater detail.

A "web page" is a client accessible database that may have text, graphic images, and even multimedia objects contained within it. When an individual on a personal computer sends a request to a server for a web page, the server first transmits data associated with the web page, and then loads, either sequentially or simultaneously, the other files associated with the requested web page. The web page is received by computer system 10 and then is loaded into memory (RAM 14) or other memory of FIG. 1, and can be displayed as a viewable object on display monitor 22. Alternatively, television display 36 of FIG. 2 could display the web page. Television display 36 could provide the user interface features for computer system 10 and additionally function as a television display 36. In one embodiment, simultaneously displaying of a television program and a web page in a dual window mode can be accomplished. A dual function could also be accomplished by reserving a channel utilizing receiver 40 for web page display. Data transfer could be achieved by utilizing a web page or file transfer protocol web site.

The Internet is utilized in the present invention for searching and finding acceptable sources of ratings then requesting data and receiving the data or "down-loading" the data into computer system 10 via telephone service provider 42 or any other communication service provider. As depicted, web sites 48, broadcast networks 46, local affiliates 50, and local cable provider 32 can all be sources providing multiple rating systems and associated data. Two basic files are provided and maintained by computer system 10. Program guide 64 contains scheduling, titles and a program identification number, and critique files 66 which contain ratings associated with program guide 64. A program identification number could be utilized to synchronize web page rating sources with program guide 64. This method of attaining ratings requires minimal time and effort after an initial set-up is accomplished. Data within critique files 66 can control television display 36 without additional user input. The present invention allows a parent to select from a wide variety of ratings rather than being fettered by ratings which originate from the broadcasters.

As depicted in FIG. 2, the present invention receives parent or user selected rating sources via the Internet utilizing computer system 10. Thereafter, computer system 10 controls receiver 40 such that television programs are displayed based on a parent's criteria as opposed to a broadcaster's criteria.

The present invention allows a user to access the world wide web utilizing a client relationship with a server. For example, an individual may subscribe to a local Christian web site for a level of censorship which the user can associate or align with. In an additional embodiment, individuals could distribute censorship guides among one another utilizing electronic distribution such as e-mail or magnetic media such as floppy disks. Different organizations or social groups and their respective web sites have different moral viewpoints with regard to different topics. Additionally, the user could easily combine the rating of the Christian network for a guide to violence censorship, and the nature society with regard to nudity.

Many organizations and social groups have web pages which provide information to current or prospective members. Organizations utilize web sites to provide insight and instruction to educate internet users about the mission or beliefs of the organization. The present invention is directed at the ability for a user, parent, or guardian to obtain an electronic information based television guide and selecting a satisfactory program guide from a large selection of program guides.

For instance, a parent might be opposed to a program which contains Atheist views. A web page could inform the parent about programs which contain such messages. Television viewers can affiliate with institutions which align with the viewers' religious and moral beliefs. Web pages or associations might have different levels or recommendations to serve varying degrees of acceptability. Therefore, a television censoring and feedback schedule can be down-loaded from chosen ratings providers who hold the same moral beliefs as the parental figure of a household. Additionally, the user has the ability to modify the television guide after receipt of the guide. A preferred embodiment receives data from a web page which is directly compatible with "V-chip" technology.

User selection of a television guide for a data down-load to computer system 10 via telephone service provider 42 could provide a copy of the selected television guide into control unit 54. In this embodiment, control unit 54 could contain all of the required data and functions to implement the present invention. Manual controls of television display 36 must be locked to prevent override by the viewer.

In a preferred embodiment, the user can down-load a web personal television guide every week from selected locations. The down-loaded process could be automated and could be performed every day at a predetermined time. Computer system 10 would access specific web sites 48 and down-load a personalized television guide. All of the automated functions could be selected by the user.

In the preferred embodiment, the adult user provides a program guide which denotes what programs are available and can be successfully requested and viewed by a child viewer. The viewer can request to view his or her personalized television guide. It is preferred that a viewer can only view a list of what programs are approved by the user for viewing.

In a preferred embodiment, display content selection criteria includes lockout or blackout during user selected time intervals. For example, a parent can deny a viewer access from 9:00 p.m to 2:30 a.m. If the viewer attempts a selection after this time, the television will not provide or blackout the attempted selection.

Additionally, during blackout, program guide 64 would not be provided. Only programs which are approved for viewing within an allowable time window appear on a child's television guide. This feature, if selected by the user, would prevent a child from becoming resentful because the child would not know about the availability of a desired program. Children can become frustrated when they know something is available, but they are not allowed to watch it. Therefore, displaying only those programs which are allowed in the program guide reduces contention and resentment.

In a preferred embodiment, computer system 10 can down-load the rating/censorship guidelines into control unit 54 of FIG. 2. In this embodiment, receiver 40 receives the identical down-loaded information as control unit 54 receives. This prevents a manual override and bypass of the remote control based censorship of the present invention. An additional embodiment provides every member of a household with a personal control unit. In this embodiment, all control units are activated with an assigned viewer password.

It is important to note that, while the present inveniton has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media includes: recordable-type media, such as floppy disks, hard disk drives, and CD ROMs, and transmission-type media such as digital and analog communication links. Examples of transmission media include devices such as modems. Modems are communication devices that enable computers such as computer system 10 depicted in FIG. 1 and FIG. 2 to transmit information over standard telephone lines.

Figure 3:
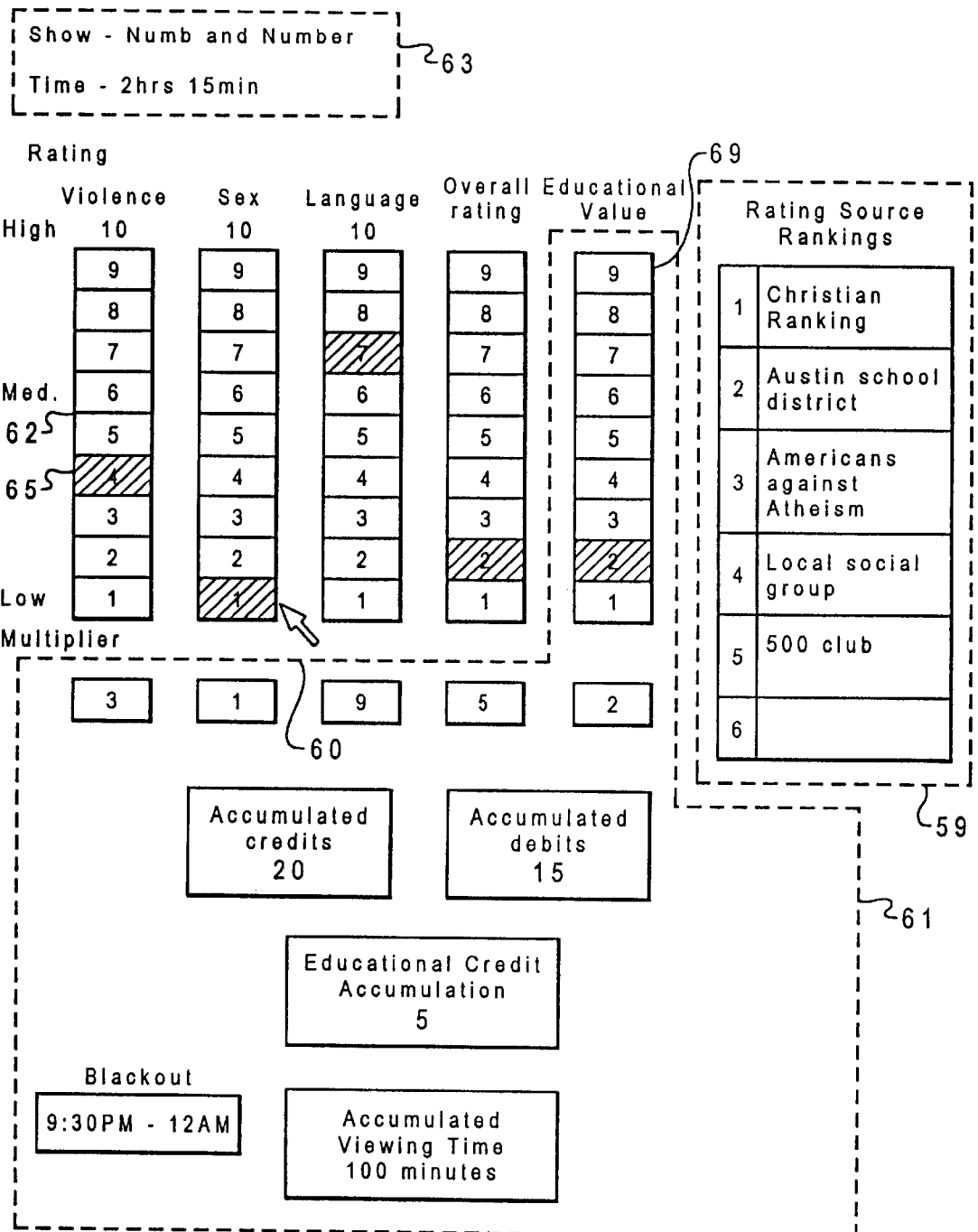
FIG. 3 illustrates a graphic user interface which could be utilized by a user to view and edit censorship levels in accordance with the method and system of the present invention.

FIG. 3 illustrates a graphic user interface for visualizing and altering the down-loaded television guide and rating system as discussed in FIG. 2. Pointing device 60 such as a mouse driven pointer could be utilized by a user to select and modify values and settings within the display area. Shaded blocks such as shaded block 65 under the violence column could be a down-loaded rating or a user input rating for the television program indicated within dashed enclosure 63. Bar 62 depicts a user selected censorship threshold level which accomplishes complete censorship. If a selected program has a rating which exceeds the censorship threshold, complete censorship occurs. The user selected threshold takes precedence over the down-loaded threshold levels which are illustrated by shaded block 65. The user can arrange each threshold level by moving bar 62 up or down to satisfy the user's attitude toward all of the categories.

The status of the viewer and a sample viewer profile is depicted in dashed enclosure 61. An explanation of the indicators within dashed enclosure 61 will become more apparent in the description of FIG. 5. The viewer's accumulated credits and debits and total viewing time can provide a viewer's status. The blackout indicator denotes a block of time which the viewer is prohibited from viewing. The row below the content classification columns, labeled multiplier, allows adjustment in the calculation of accumulated credits and debits. Total accumulated viewing time is also depicted within dashed enclosure 61. An assigned educational value column 69 is also present to allow user adjustment of educational viewing credits. A rating source ranking determined by the user is illustrated within dashed enclosure 59. The rating source ranking determines what rating sources will be accessed and in what order the rating sources will be accessed. The graphic user interface depicted in FIG. 3 is only an illustration of one potential implementation. The content and operation of the graphic user interface of FIG. 3, should not be construed in a limiting manner.

In one embodiment, the present invention can load the graphical user interface of FIG. 3 contemporaneously with each viewer request achieving real-time censorship. Additionally, contemporaneous censorship can be achieved. Time segments of a program which exceed a level of user defined offensiveness are interrupted. For example, if only one minute or only one word of unacceptable material exists in a program, that specific time window could be censored utilizing the aforementioned communication link. When a level four is selected on the user interface of FIG. 3 and the violence level of a program exceeds a level 4 for a ten minute segment, real-time contemporaneous censorship could be implemented to block these ten minutes. This embodiment requires a rating service to provide ratings at all potentially offensive segments of a program.

The communication link with rating sources can be implemented at any time triggered by any criteria. Additionally, data revealing offensive scenes must be synchronized in time. In the implementation of real-time censorship, a rating could be down-loaded at the beginning of the program and computer system 10 could synchronize the real-time censorship as it occurs in the program. The present invention has the ability to query rating sources before a program commences, in response to a new view request for a channel, and anytime during a program.

The present invention provides the parent with the option of allowing marginally offensive topics or classifications to be viewed in moderation. For example, a user profile may be set such that a child may view as many educational programs as desired, but "entertainment" may only be watched in defined quantities. Alternately, only a defined quantity of violence may be watched before censorship is implemented. In addition to controlling viewing time of marginally acceptable material, watching subject matter which exceeds the set threshold level of violence can still be allowed by the present invention for predetermined durations.

A preferred embodiment of the present invention implements a system for attaining viewing credits based upon accumulated viewing time of desirable material. Credits are attained by a child after accumulating viewing time which is classified as desirable or educational by the parent. The amount of credits achieved may be reduced by the cumulative amount of undesirable harmful material viewed. An embodiment of the present invention allows for a credit and debit system which utilizes multiple variables.

The present invention provides multidimensional control over a viewer's environment. For example, the accumulated amount of time spent viewing a program multiplied by a user defined rating would produce credits and debits. For example, a user selected violence level of 0.5 multiplied by the amount of view time, say 10 minutes provides 5 debits to the user profile. Viewing level 5 violence for 1 minute would be equivalent to watching 5 minutes of violence classified as a level 1.

Viewer credits and debits can be displayed upon request to the viewer or user as depicted in dashed enclosure 61 of FIG. 3. The adult user can control the value associated with every individual category such as violence and language. The multiplier value is depicted below each column and is associated with each column. Every category level can be associated with the multiplier to further adjust the system to a parents desire. For example, if a parent is not concerned about comic violence such as a western comedy with a shootout, but is very concerned with profanity, he or she could set the system such that viewing mild violent content would not incur any debits. Likewise, the language column would be set with high values. In this case, a child would quickly fill his or his debit quota watching a program with profanity, but not be punished for viewing a shoot out comedy. Under every category, the viewing time and intensity level of the classification is utilized in a user developed equation to determine the amount of credits and debits accumulated with each classification of subject matter.

Educational credits can be assigned by a parent or down-loaded from an information source as depicted by educational value column 69. Additionally, rating source rankings allows a parent to rank rating sources. The rating source ranking determines the order in which the rating sources are queried. In one embodiment if the first source is not available, lower ranked sources are queried until an acceptable source is located.

Figure 4:
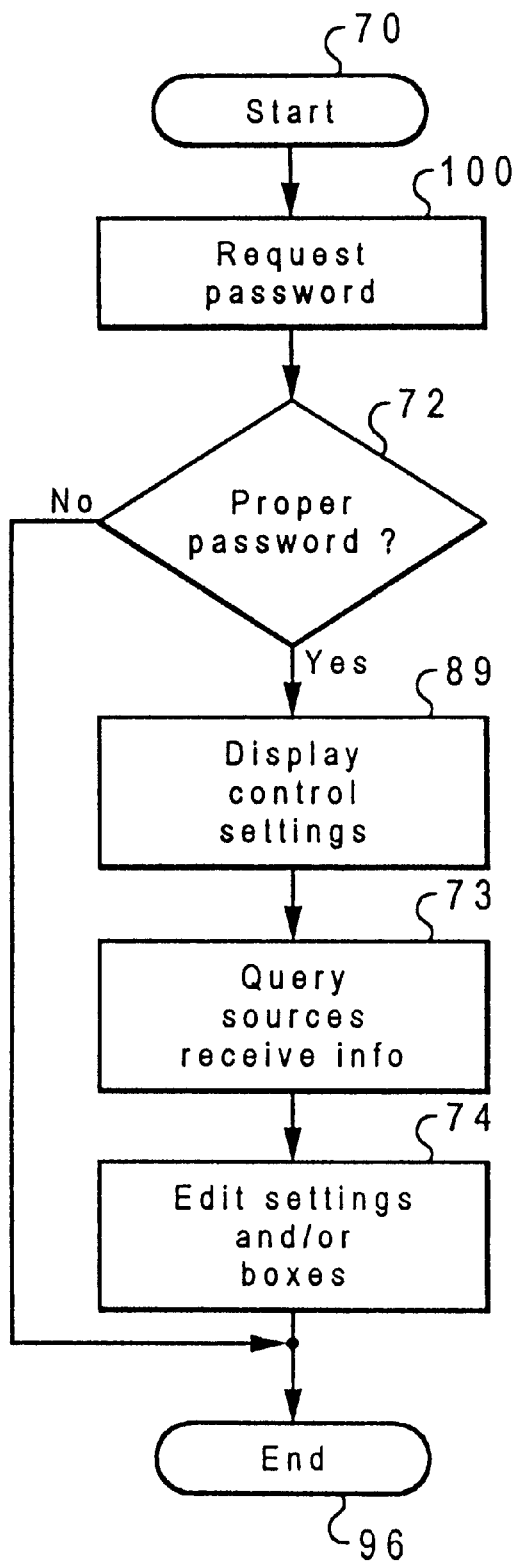
FIG. 4 depicts a high level logic flowchart illustrating a set-up mode in a preferred embodiment of the present invention.

Referring to FIG. 4, a high level logic flowchart illustrating a set-up mode is depicted in accordance with the present invention. The process begins at block 70 and thereafter proceeds to block 100 where a parent/user password is requested. In response to the request, the method checks to see if a proper password has been entered as in block 72.

If the proper password cannot be provided by a user, the method proceeds to the end illustrated at block 96. If the proper password is entered, control settings are displayed as illustrated with block 89. Next, support information is requested as in block 73. In order to make a decision on a particular setting, the user can query additional sources in block 73. These sources may be located by accessing an interconnected information source or the requested information might be contained in memory of computer system 10. Next, as illustrated in block 74, the user is allowed to edit settings such as the censorship thresholds as depicted in FIG. 3. Particularly, the user can determine settings such as the censor selection depicted in block 75 of FIG. 5 discussed below. After user editing is accomplished then the process ends at block 96.

Figure 5:
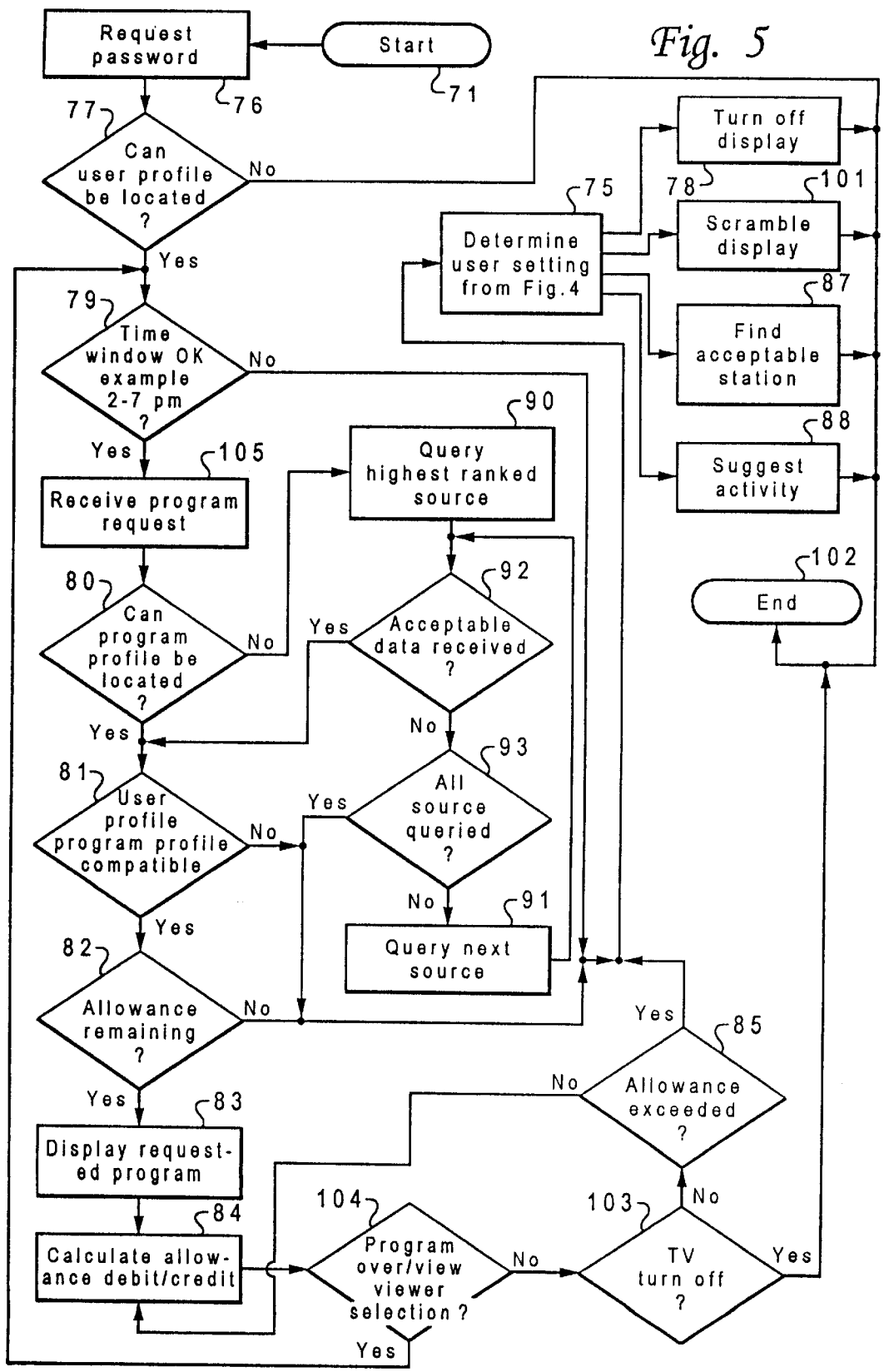
FIG. 5 illustrates a high level logic flowchart depicting a broadcast censorship mode in a preferred embodiment of the present invention.

Referring to FIG. 5, a high level logic flowchart of television control in accordance with the present invention is depicted. FIG. 5 will be described in the context of the hardware explained in FIG. 2 and the graphical interface of FIG. 3. The process starts at block 71, and thereafter proceeds to block 76.

Referring to block 76, the method requests a password. Utilizing the password the method locates the user profile associated with the requested password in accordance with block 77. If the user profile can not be located, the method proceeds to block 102 which prevents activation of the display. If the user profile can be located, the method compares a control setting of "time window blackout" with a real-time clock as depicted in block 79. If the viewer request is within a prohibited time window, the method proceeds to block 75 and the television implements a method of television control determining by the user setup of FIG. 4, such as turn off or scrambling. However, if the time window is acceptable, the method proceeds to block 105 and receives the viewer program request. Next as in block 80, the method attempts to locate a program profile. The method may utilize the rating system for a local search of memory. Alternately, the method may access a disk drive. If the program profile can be located in RAM 14 of computer system 10 of FIG. 1, the user profile and the program profile are compared to determine if the censorship settings are compatible as illustrated in block 81. If a parent has selected censorship based upon a simple rating threshold, and the threshold rating is exceeded the program selection and the method proceeds to block 75 and the television implements a control method. If a multidimensional approach is selected by the parent and the requested program is compatible with the program selection, or alternatively the program does not exceed the user determined threshold level, the method proceeds to block 82. In block 82, the method determines if the viewer profile for the present viewer has a time allowance remaining or if any viewing credits remain. If there is an allowance remaining, the viewer program request is displayed to the viewer as illustrated in block 83. Next, as depicted in block 84, the method monitors the viewing time and allowance remaining by continuously calculating viewing time. Then, as illustrated in block 104, the method continually checks for viewer input for a new program selection and the method continually monitors the television to determine if a selected program has ended. If a new program is selected by the viewer or a program has ended, the method returns to block 79 and proceeds as previously discussed. If the television is turned off, the method proceeds to block 102 and the process ends. As the television display remains active, the accumulation of debits and credits is determined as in block 85. If the allowance is exceeded, the method proceeds to block 75. Depending on the user's selection in the control settings, the method can thereafter proceed to scramble the television as in block 101 or tune in a user selected acceptable station as depicted in block 87. If an acceptable station can not be found, or if the user selects interactive control, the method proceeds to suggest an activity for the viewer as depicted in block 88. The method of censorship depends on the user selected decision at block 75. As depicted by the control methods of blocks 78, 87, 88, and 101, multiple alternatives to control the childs environment can be selected by the user.

Referring back to block 80, if the program profile can not be located in RAM 14 of computer system 10 of FIGS. 1 and 2, the method proceeds to block 90. As illustrated in block 90, the highest ranked source is queried to locate a rating system. This is typically accomplished by computer system 10 forming a communication link with other interconnected computers (not illustrated). Within the display control settings, the parent can rank a large database of local or internetworked rating systems. The ranking feature is depicted by dashed enclosure 59 of FIG. 3. The user ranking of sources can be utilized to identify the location or address of the highest ranked or top ranked rating source. After the top ranked source is queried as in block 90, the system determines whether acceptable data has been received from the rating source as in block 92. If the response is unacceptable, the method proceeds to block 93. In block 93, the method determines whether all sources have been queried. If they have not been queried, the next source is queried from the ranking list as in block 91. The results from the next source are checked for acceptability in block 92. If acceptable results are received, the method proceeds as discussed above in block 81. If acceptable results have not been received, and all sources have been checked, the method proceeds to decision block 75. In block 81, the user profile is accessed and the method proceeds as discussed above. After the control methods of blocks 78, 87, 88, and 101 are achieved, the method proceeds to end block 102 and awaits further input.

In the present invention, a parent or guardian who desires to control the display content on a television set within his or her home can receive the control data from a web page via multimedia provider 44. Alternatively, the parent can manually set the threshold censorship values. Additionally, a parent can rank rating systems. If a web page does not rank all programs, the present invention will traverse the ranking to locate a source which has rated the viewer selected program. When a viewer requests a program, computer system 10 provides a communication link, real-time, and traverses the ranking list to find an available rating source and its associated ratings. When a source is located which has a rating for the viewer selected program, the present invention may stop or it may continue and accept multiple sources. A single source rating system is utilized in a priority based system. In a priority based system, the highest ranked rating system is received and utilized by the present invention. When multiple ratings for a single program are received, the ratings are overlayed such that the peak level under each category is stored for the rating value. This is referred to as an interleaved rating system. A weighting system can also be utilized int the interleaved embodiment. For example, if one source rates violence as a 5 and sex as a 1 and another source rates sex as a 5 and violence as a 1, the hybrid rating would be a 5 for both the sex and violence categories. The content ratings and program scheduling must be synchronized with the viewers access time. Additionally, for the parent, the web sites 48 could provide detailed descriptions of the content of a program and detail the fundamentals of the rating guidelines which are utilized to produce the rating.

In a simple embodiment, a child could watch a movie only after gaining so many credits from watching educational programs. Likewise, if a child has exceeded his specified allotment of viewing time of undesirable material, television display 36 would either shut off, scramble or switch to an approved channel. Additionally, the present invention allows the parent to manually input debits or punishments and credits or rewards for actual conduct. A guardian could manually input debits according to observed behavior such as not performing homework or household chores. Likewise, a good report card might boost a child's credits. The present invention has a multidimensional approach and allows much greater resolution of censorship and behavioral training with less effort on the parental figure.

A guardian may not want to censor everything all the time. The present invention allows for emulatation of real life situations. It allows a parent to permit viewing of subject matter which may have borderline objectionable material contained in it, but prevent a child from viewing too much objectionable material. The accumulated view time quota allows a child to exercise judgement, but after reaching a threshold accumulated viewing time which contains undesirable content, a punishment or correction mechanism is provided. When punishment is desired, the user selects or manually inputs his or her desired punishment. The punishment might be censoring viewing time or specifying household chores or duties. The specified chores would be display on the television when the view time/content threshold is exceeded.

The present invention allows a child to learn to deal with natural consequence, similar to the rewards and punishments in adult life. Accordingly, a child would experience some responsibilities of adulthood by utilizing the present invention. Particularly, the present invention provides real world situations where the exercise of freedom is allowed and censorship is not implemented by a rigid framework.

The user can also select a stricter teaching system. In this system, tolerance is allowed to a defined threshold level. After that threshold level is exceeded, more drastic measures are taken. Provisions such as television blackout for a predetermined amount of days might be acceptable punishment for excess viewing of undesirable material or failure to do school work. This embodiment reflects real-life experience. Often, in adult life behavior is tolerated to a limit, and then dire consequences follow. This embodiment is important because subject matter which is questionable or borderline can be objectionable in some aspects and educational or good in other aspects. The disciplinary aspect of the present invention can apply to watching too much of any predetermined category. However, the disciplinary system of the present invention can also be offset by educational viewing credits.

The present invention allows many additional embodiments. Selecting channels or television guides directly from a rating source allows advertisers and pollsters to gather data about the content which is being viewed and the content which is being censored by the public. Real-time look up of ratings in response to a viewer's request, supplies a rating source with the programs which are most frequently requested and what censorship is implemented within a household. When a viewer selects a program and a rating source is queried, the time between queries can be utilized to track the duration of viewing. Viewer duration could also be utilized to charge customers for pay per view events and specifically pay per views which are not viewed in their entirety.

The present invention offers advantages of on-line feedback. The user could provide feedback, comments and votes on programs to a rating source. Current feedback systems are unorganized and unstructured. Rating sources could make better choices utilizing user and viewer input. Additionally, producers or broadcast networks could make better programs in the future utilizing user feedback.

While the invention has been particularly shown and described with reference to a preferred embodiment, it will be understood by those skilled in the art that various changes in form and detail may be made therein without departing from the spirit and scope of the invention.

What is claimed is:

1. A method for regulating the media environment of a television viewer by controlling content displayed on the television in response to a viewer profile, accumulated viewing time and at least one content classification source, said method comprising the steps of:

storing content classification values for material to be displayed, wherein said content classification values categorize desirable content and undesirable content;

storing viewer profile data wherein said viewer profile data associates a viewer with said content classification values;

determining the quantity of time said viewer spends viewing said desirable content;

determining the quantity of time said viewer spends viewing said undesirable content; and regulating the media environment of said viewer in response to said determined quantity of time spent viewing desirable content and said determined quantity of time spent viewing undesirable content and said viewer profile data, wherein a viewer's request for viewing a television is regulated based upon accumulated view time of undesirable content and desirable content.

2. The method of claim 1, further comprising the step of down-loading said content classification values utilizing information sources.

3. The method of claim 1, further comprising the step of selecting from a plurality of content classification value sources.

4. The method of claim 1, further comprising the step of editing the stored content classification values.

5. The method of claim 1, further comprising the step of providing data to said media environment.

6. The method of claim 1, wherein the step of regulating the media environment of said viewer is further comprised of influencing the viewer by censoring future television display content based upon said determined quantity of time spent viewing undesirable content.

7. The method of claim 1, wherein the step of regulating the media environment of said viewer is further comprised of allowing extended viewing time for said viewer in response to said determined quantity of time spent viewing desirable content.

8. The method of claim 1, wherein the step of regulating the media environment of said viewer is further comprised of instructing said viewer to perform tasks in response to a predetermined quantity of time said viewer spends viewing undesirable content.

9. The method of claim 1, wherein the step of regulating the media environment of said viewer is further comprised of displaying a seamless channel selection.

10. The method of claim 1, wherein the step of regulating the media environment of said viewer is further comprised of influencing the viewer by removing said media environment in response to a user defined quantity of negative credits.

11. The method of claim 1, wherein the regulating of said media environment is further comprised of the step of displaying only positively classified content.

12. The method of claim 1, further comprises the step of:
assigning a ranking each said ranking having a highest number and lesser numbers, to content classification values; and
sequentially searching the highest number to the lesser numbers to determine an acceptable content classification value.

13. The method of claim 1, further comprises the step of synchronizing said viewers request with said content classification values.

14. The method of claim 13, wherein said synchronizing is accomplished by a reference signal contained within a broadcast signal.

15. A method for implementing multidimensional contemporaneous control of television display content in response to a viewer profile, a plurality of rating systems, and a request by a viewer to utilize a Television display, said method comprising the steps of:

storing viewer profile data;

ranking more than one rating source;

accessing a selected rating source among said more than one rating source contemporaneously with a viewer request in response to said ranking; and receiving content classification data from said selected rating source, said content classification data having predetermined levels which are correlated with said viewer profile data and synchronized in time with said viewer request, wherein content on a television display is controlled, real-time, utilizing said selected rating source and said viewer profile.

16. The method of claim 15, further comprising the step of interleaving said more than one rating source in response to said ranking to produce a hybrid rating guide.

17. The method of claim 15, further comprising the step of selecting a threshold censorship value.

18. The method of claim 17, further comprising the step of censoring said television display in response to said selected threshold censorship value.

19. The method of claim 15, further comprising the step of selecting a censorship value associated with each offensive category.

20. The method of claim 15, further comprising the step of activating in response to a valid user password.

* * * * *